United States Patent

Molloy et al.

[15] 3,675,196

[45] July 4, 1972

[54] TRAFFIC SIGNAL CONTROL SYSTEM

[72] Inventors: Kenneth H. Molloy, Bedford; John P. Ward, Acton; Victor Mark Benson, Groton, all of Mass.

[73] Assignee: Computer Systems Engineering, Inc., No. Billerica, Mass.

[22] Filed: Jan. 25, 1971

[21] Appl. No.: 109,533

[52] U.S. Cl. ....................340/40, 340/35

[51] Int. Cl. ....................G08g 1/08

[58] Field of Search ....................340/35, 40, 37, 41

[56] References Cited

UNITED STATES PATENTS 3,482,208 12/1969 Auer, Jr. et al. ....................340/35

3,302,170 1/1967 Jensen et al. ....................340/40

3,252,133 5/1966 Auer, Jr. et al. ....................340/35

*Primary Examiner*—Kathleen H. Claffy

*Assistant Examiner*—Randall P. Myers

*Attorney*—Robert T. Dunn

[57] ABSTRACT

An automobile traffic signal control system controls traffic signals (lights) at a plurality of traffic intersections by way of a master controller which communicates with a local controller at each intersection and transmits pulse trains containing sets of data bits in sequence to the receivers at all the intersections, whereupon the intersection to which a specific set of data bits is addressed stores the set and uses each specific bit in the set to control a specific light or signal at that intersection. In this manner, all lights and signals at all intersections are specifically each controlled by a specific bit in a specific set of bits transmitted by the master controller to the local controllers at the intersections.

11 Claims, 10 Drawing Figures

INVENTORS
KEN H. MOLLOY
JOHN P. WARD
VICTOR MARK BENSON

BY Robert T. Dunn
ATTORNEY

INVENTORS
KEN H. MOLLOY
JOHN P. WARD
VICTOR MARK BENSON
BY Robert T. Dunn
ATTORNEY INVENTORS
KEN H. MOLLOY
JOHN P. WARD
VICTOR MARK BENSON
BY Robert T Dunn
ATTORNEY INVENTORS
KEN H. MOLLOY
JOHN P. WARD
VICTOR MARK BENSON
BY Robert T. Dunn
ATTORNEY INVENTORS
KEN H. MOLLOY
JOHN P. WARD
VICTOR MARK BENSON
BY Robert T. Dunn
ATTORNEY

TRAFFIC SIGNAL CONTROL SYSTEM

DISCLOSURE

This invention relates to a system for controlling traffic signals at a number of traffic intersections and more particularly to a system in which pulse signals are transmitted from a master control station to local control stations at each of the intersections where these signals are used to control the intersection lights and signals.

Electro-mechanical controllers are commonly used to control the lights at a traffic intersection. These controllers consist of a dial driven by a synchronous motor and a cam shaft which is rotated by a stepping mechanism. The cams on a cam shaft control power to the signal lights at the intersection through contact switches and there is a unique position of the cam shaft for every interval in the cycle of the lights at the intersection. Timing for the cycle is derived from keys on the rotating dial which actuate the cam shafts stepping mechanism to change the intervals in the cycle. Such controllers are set by hand and once set have a fixed cycle and fixed intervals. Thus, the "cycle split" is fixed once it is manually set.

The first computerized traffic control systems provided a separate communication cable from the master to each local controller. By way of these cables, the master controller provided to each local controller a selection of cycle lengths, splits, and offsets. Here all timing was controlled by stepping mechanisms at the local controllers which were advanced by signals from the master controller, but which turned fixed cams.

In some of these systems, a master transmits a reference pulse to the local controllers and a reference point on the dial at each local controller is synchronized with the transmitted pulse to establish the intersection offset. The relative offsets at different intersections can not be changed without manually changing the dials at each intersection or by transmitting a different control pulse to each intersection for synchronism therewith. One fault in such systems is that if an intersection is out of synchronism, the dial just stops until the intersection is again in synchronism. This produces unusual interval lengths at the intersection and confuses motorists. A wire must be run from the master controller to each local controller for carrying the synchronizing pulse that determines offset.

More recently, computerized traffic control systems have been proposed in which the motors and cams at the local controller have been eliminated and replaced by digital control circuits. One such system described in U. S. Pat. No. 3,482,208 uses a bipolar pulse code which is transmitted by the master controller to the local controllers. The pulse code consists of a data word prefaced by an address signal to a specific intersection local controller. The data word consists of four bits and identifies up to 16 intervals. This word is decoded at the local controller by logic circuits to ascertain the interval called for. For example, if the binary word is 15, all lights at the intersection may turn red and remain red until a new number is received. The new number may be 14 which maintains all lights red and turns on the pedestrian "walk" lights in all directions. This is followed by number 13 which still maintains all lights red but turns on the flashing pedestrain "don't walk" signs. Thus, the interval numbers control the total display at the intersection. In this system, each intersection local controller must have the capacity to decode the received binary words for the four bit numbers in order to operate the vehicle and pedestrian signals at the intersection. Quite clearly, when the intersections have different requirements as to the number of lights and pedestrian signals, then the decoders at the local controllers for those intersections must be different. The decoder is a special purpose digital computer and so with this system applied to the complex problems of a typical city, there must be designed and constructed a distinct special purpose digital computer for each local controller. Clearly, the decoders for a three or four way intersection will be different and of different complexity than the controller at a simple two way intersection. Also, the internal definitions are fixed at the local controller and cannot be modified by the central computer.

It is one object of the present invention to provide a computerized traffic control system with a central master controller and local controllers at each intersection wherein the requirement for the special digital computer for decoding signals at each local controller is eliminated and the local controllers are relatively uniform regardless of the particular different requirements of the signalling at the different intersections.

It is another object of the present invention to provide a computerized traffic control system wherein cycle length and intervals and cycle offset and split at the intersections are controlled from a master controller remote from the intersection local controllers.

It is another object to provide such a system by which individual lamps at each intersection are controlled directly from the master controller.

It is another object to provide such a system employing relatively few communication lines between the master controller and the local controllers thereby reducing the cost of the communication lines.

It is another object to provide such a system wherein the number of different combinations of cycle length and interval and cycle split and offset are not limited by the size of transmitted binary words over communication lines between the master controller and local controllers.

It is a further object of the present invention to provide traffic intersection local controllers and communication lines between the local controllers and a master controller such that all programs for controlling all lights at all intersections are formulated and controlled at the master controller and these programs can be modified at the master controller by online equipment without the necessity of hardware modification at the local controllers.

It is a further object in such a system to simultaneously transmit control and clock signals from the master controller to the local controllers on a single transmission line.

It is a further object to provide in such a system at each of the local controllers, integrated therewith, a digital backup system for controlling the intersection lights in the event the normal control signals from the master controller fail to provide the intended control.

It is a further object to provide in the backup system separate communication lines from a backup master controller, whereby the backup master controller dictates to the backup system at each local controller at least a selection of cycle lengths, intervals, cycle splits, and offsets.

The computerized traffic control system described herein provides hardware capable of implementing almost any control strategy that a typical city may require. A two wire transmission line from the master controller to the local controllers carries all normal control signals transmitted for controlling the intersection lights. Trains of signals are transmitted over this line which carry therein the intersection address, a set of data bits for controlling the signal lights at the intersection, and check signals for ascertaining that the signals have been received properly and without error. The data set consists of a separate signal pulse identified with each light at the addressed intersection and so each of these pulse signals, also called data bit, is effective at the intersection to control a specific light, either turning the light on or maintaining it on if it is already on, or turning the light off or maintaining it off if it is already off. Thus, decoding of the data at the local controller is not necessary and the same control circuit can be used at each intersection even though the number of vehicle nd pedestraian lights and the intrinsic functioning of these lights may be different at each intersection. The received data is a train of pulse levels representing binary 1 and binary 0. These are received into a shift register, the data stages of which are each identified with a specific light at the intersection and so, depending upon whether the signal is binary 1 or binary 0, that light is turned on or off.

The two element transmission line carries the data signal train from the master controller to a first local controller which receives the signal train and simultaneously transmits it to a second local controller and meanwhile stores the set of data bits and address in the received signal train in a shift register. The second local controller receives the same set and address transmitted from the first local controller and also stores it in a shift register and transmits it to a third local controller and so forth. Thus, the set of data bits and address transmitted by the master controller is stored in each of the local controllers. Then, in the local controllers each local controller compares the received address with the local address while making a cyclic check for errors in the received set of data bits. If the received set of bits checks alright, the local controller to which it is addressed feeds the data bits from bits shift register to a buffer register that controls the lights at the intersection turning lights off or on as dictated by the data bits. At the next transmission interval, the set of data bits is addressed to another local controller and is received by all of the local controllers replacing the previously received set and address stored in the shift registers in all of the local controllers. This sequence of transmission by the master controller continues until the buffer registers in all of the local controllers are loaded with controlling signals for the lights at the intersections and then the transmission sequence is repeated.

The local controllers are also equipped to store signals initiated by vehicles and pedestrians at or near the intersection. Switches initiated by vehicles and pedestrians are monitored and data gathered at each intersection. These data are inserted into the shift register at the local controller between the intervals of transmission from the master controller and after the received signal train containing a set of data bits and address, stored in the shift register has been examined for address and has been shifted into the buffer register at the local controller to which the set of data bits is addressed. The vehicle and pedestrian detection signals are then shifted out of the shift register and to a transmitter at the local controller. The local controllers transmit these signals representing vehicle and pedestrian data in relay fashion back to the master controller just as the master controller signal trains are transmitted relay fashion from local controller to local controller. Thus, at each local controller, the shift register which receives the signal train from the master controller each time a signal train is transmitted by the master controller also serves briefly to store in parallel fashion numbers representing vehicle and pedestrian density and feed these numbers out in serial fashion to a transmitter which transmits them back toward the master controller. The vehicle and pedestrian data need not be preceded by an address signal indicative of the intersection from whence it comes, because the local controller transmits immediately after its message has been received from the master controller. Therefore, the master controller knows which local controller is transmitting. At the master controller these signals serve as inputs to alter the control programs for the intersection from whence they came.

Other objects and features of the present invention will be apparent in view of the following specific description of an embodiment of the invention taken in conjunction with the figures in which:

FIG. 3 shows by waveforms the time intervals of transmission and receiving from the master controller to the local controllers and vice versa;

FIG. 5 illustrates the format of a data signal train transmitted by the master controller to the local controllers;

FIG. 6 illustrates in particular the intervals between transmission of data signal trains by the master controller during which received data stored in the shift register bearing the address of the local controller is identified, examined for error, and shifted into a buffer register for turning lights at the intersection off or on;

Vehicle traffic control in its simplest form involves repetitively cycling the lights through a series of fixed time intervals. During each interval, a fixed set of lights is turned on. The sum of all interval durations in the cycle equals the cycle length. Several specific phases can be recognized during a typical cycle. A phase is a part of a cycle allocated to a movement of traffic. The cycle split as defined herein refers to the way time in a cycle is assigned to all the phases. For example, at a simple crossing of a street running north and south with a street running east and west, the split may be 50–50 if the traffic loads on the two streets are equal or they may be 60–40 if the traffic loads are not equal. At a three way intersection of two major arteries with a secondary street, the split may be 40–40–20 and so forth. The intersection is further complicated when vehicle and pedestrian detectors are included. It is sometimes desired that the signals from vehicle detectors dictate the intervals and even determine whether additional intervals will be added to the cycle. Where vehicle detectors are used, the exact signal cycle at an intersection may be determined on a cycle by cycle bases by the vehicle detectors on at least some of the vehicle approaches and in some cases on all vehicle approaches. Where, some of the approaches are equipped with vehicle detectors, this control is called semi-traffic actuated and where all approaches are equipped, it is called full traffic actuated control.

Traffic flow in a city can usually be improved by providing synchronization of the signals at a set of intersections. The intersection offset is the number of seconds or the percent of cycle length after a reference time that a particular interval should start.

A sophisticated computerized traffic control system for controlling the multitude of complex intersections in a typical city ideally is capable of unlimited variation of cycle length, cycle intervals, and phases, cycle split, and cycle off set. It includes vehicle and pedestrian detectors wherever such controls are significant and so there should be a continual flow of signals from the master control to the local controllers and from local controllers to the master controller. In addition, all programs at the master controller should be easily modified by traffic engineer inputs from a teletype terminal and other equipment which is keyed from police, fire, and emergency alarm systems in the city. The local controllers and the transmission system between the local controllers and master controller and the format of signals in conjunction with modern computer equipments available for use at the master controller provide a system which approaches this ideal.

Figure 1:
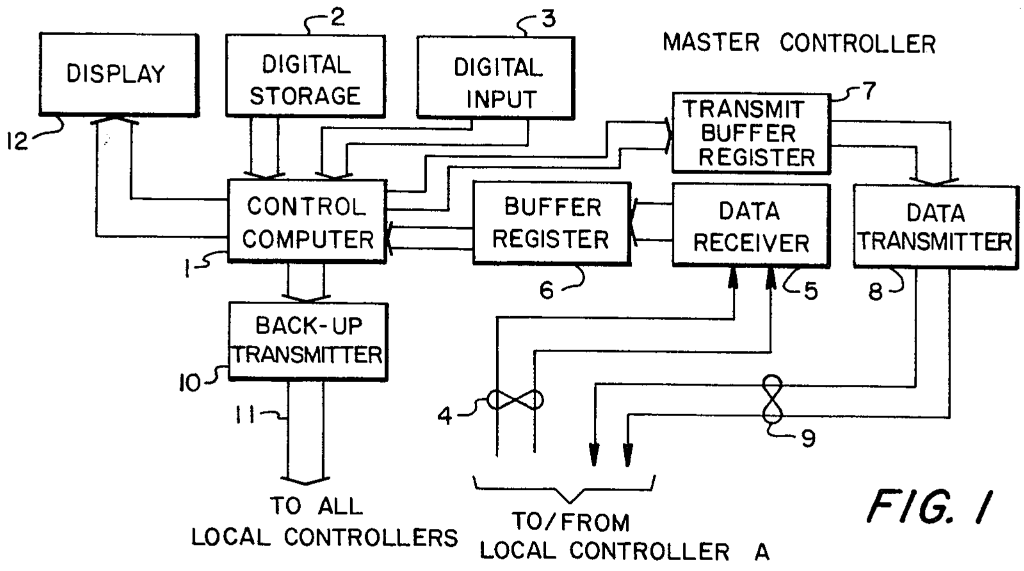
FIG. 1 is a block diagram showing the principle equipments at the master controller.

FIG. 1 illustrates the master controller functions and equipments by way of function blocks. At the master controller, a control computer 1 which may be a general purpose computer controls programs for all lights at all intersections in terms of the cycles, phases, and intervals, and the split and offset. This information is stored and subject to continual inputs from the intersections, the traffic engineer teletype, and other inputs from police, fire, and emergency monitors in the city. These factors are all fed to the control computer to determine the on-off sequences for each light at each intersection including the pedestrian as well as vehicle lights. All of the inputs are represented by the digital storage 2 which feeds fixed programs to the computer and the digital input 3 which feeds variable data to the computer except the vehicle and pedestrian data to the intersections. Vehicle and pedestrian data from the intersections is fed to the computer via the two conductor transmission line 4 from the first local controller in the chain; this is local controller A. The data from the local controllers is received by data receiver 5 and stored in buffer register 6. This data is fed from the buffer register to the control computer to select signals to the local controllers depending upon predetermined programs and conditions measured at the intersection.

The normal operation output from the control computer consisting of the signals which make up the data signal trains is fed from the control computer to transmit buffer register 7 as parallel signals. From the buffer register 7, the signals are shifted out at clock rate defining the data signal trains and they are converted into a bipolar form of signal with binary information carried in transitions of the waveform and such that a transition is made at each clock pulse. This waveform is described herein with respect to FIGS. 8*a* and 8*b*. The data signal train is transmitted by the data transmitter 8 over transmission line 9 which is a two wire line. The line 9 goes to a receiver in the first local controller which is local controller A.

Backup signal transmitter 10 at the master controller continually transmits backup signals to all of the local controllers over a common transmission line 11. This transmission line 11 consists of a multitude of wires carrying 110 volt ac which turns on and off to signal over each wire. At each local controller, a backup system (shown in FIGS. 4 and 9) containing a specially programmed matrix responds to the signals transmitted over transmission line 11 producing signals for controlling the lights at the intersection. The backup signals are not used to control the lights unless the local controller logic has issued a command to switch to backup. The matrix at each backup system in each local controller is programmed in view of the particular needs of the intersection and so local controllers for intersections having substantially different needs will respond differently to the signals transmitted over transmission lines 11 from the backup transmitter.

A display 12 is provided at the master controller displays to the traffic engineer and staff, traffic situations, and other information which may warrant a variation of the programs in the control computer. For example, the display may be a map of the city showing all arteries and intersections with lights and other variable information on the display to reveal the operation of the lights at the intersections.

Figure 2:
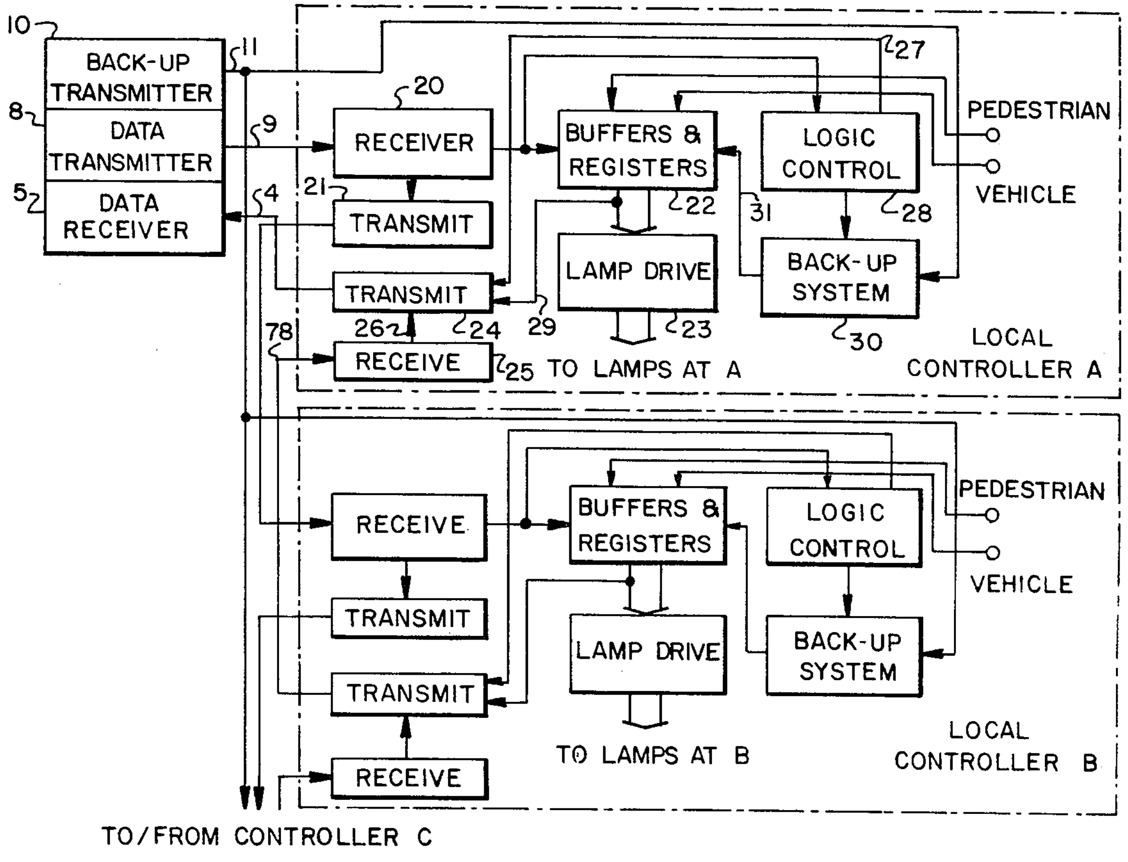
FIG. 2 is a block diagram showing the principle equipments at two local controllers denoted A and B as an aid to understanding the general functioning relationship between the equipments at each local controller and the transmission lines between local controllers and the master controller.
Figure 8A:
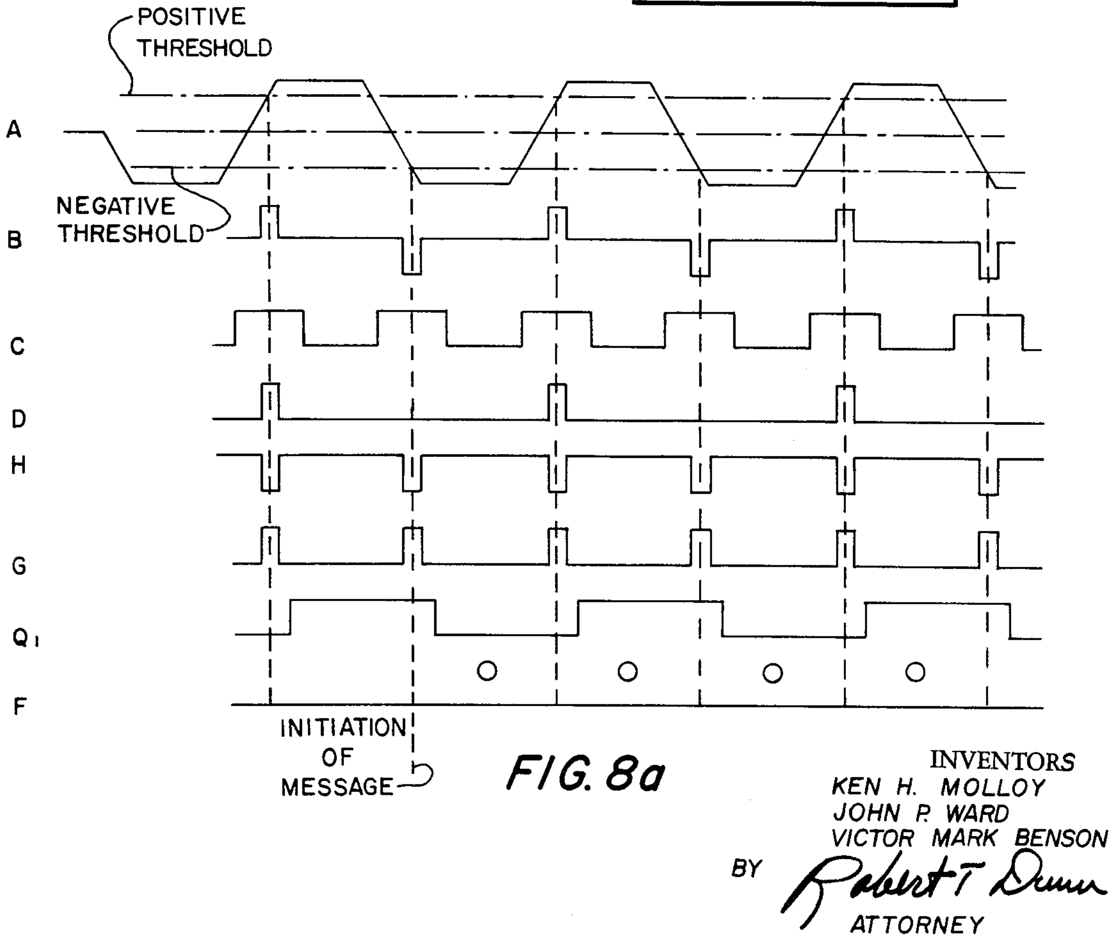
FIGS. 8a and 8b show waveforms at various points in the communication process logic system of FIG. 7 as an aid to understanding operation of the system.
Figure 8B:
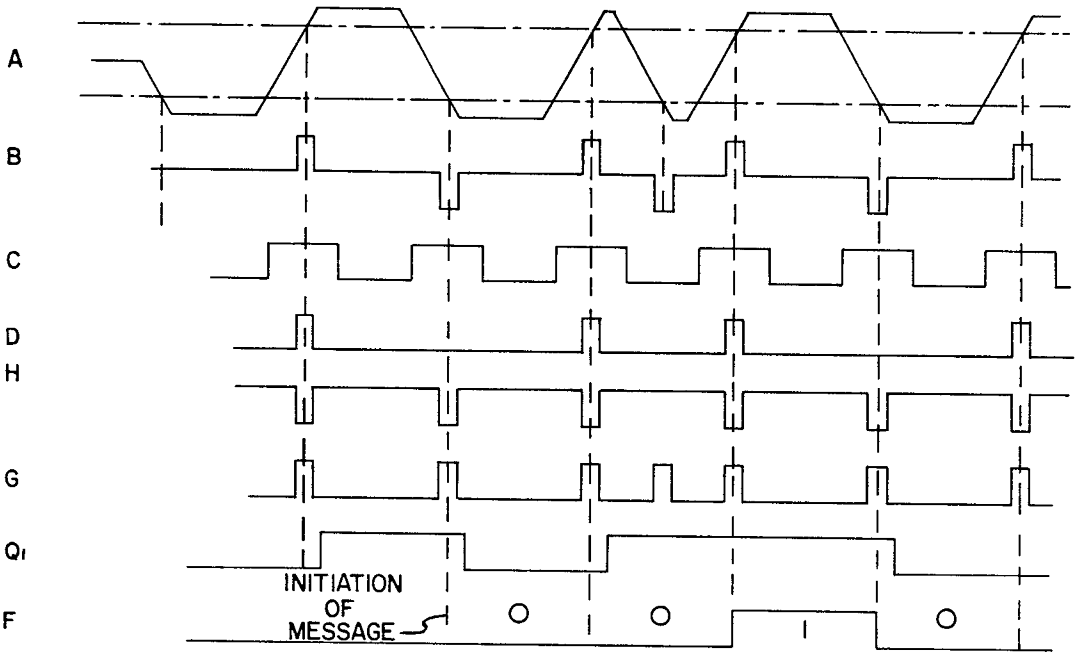

FIG. 2 shows the functioning of the local controllers with respect to the master controller. Two local controllers are shown A and B, each containing identical electronic equipments and so they operate identically except for the different matrix programs in their backup systems. At each local controller such as local controller A is a receiver 20 and transmitter 21 which receive and relay the data signal trains from the master controller transmitter 8 on to the next controller which in this case is local controller B. At the controller A, the received data signal train of waveforms such as shown in FIGS. 8*a* and 8*b* are processed producing a train of binary pulses and clock pulses. The binary pulse train containing address, data, special bits, and check bits is fed into a shift register in registers 22 which also contain circuits for performing a cyclic check of the received pulses to determine errors and an address check to ascertain whether or not the signal train is intended for local controller A. If the signal train is intended for local controller A, then the pulses stored in the shift registers 22 are fed in parallel fashion to the lamp drive circuits 23 which control energization of the lamps at the intersection A.

Between transmissions of data signal trains from the master controller and immediately after a signal train is received by local controller A which is addressed to that controller, pedestrian, vehicle, and intersection status data at intersection A are fed via the buffers and registers 22 to the transmitter 24 which immediately transmits these numbers serial fashion along with the address of controller A over the transmission line 4 to the receiver 5 in the master controller. The other local controllers will perform in the same manner to transmit such data back to the master controller. In each case the local controller will transmit this data representing pedestrian, vehicle, and intersection status during the transmission interval immediately following receiving a data signal train addressed to the local controller. Thus, the address of the local controller need not be transmitted with the data as the master controller will know from whence comes the data and is programmed accordingly.

The pedestrian, vehicle, and intersection status data is relayed from local controller to local controller until it arrives at the master controller. For this purpose, the transmitter 24 and receiver 25 in each local controller receive transmitted data from another local controller and pass it on to still another. In local controller A, the receiver 25 receives data from local controller B and this is conducted uninterrupted over line 26 to transmitter 24 and retransmitted onto the master controller receiver 5. A switch in the transmitter 24 controlled by line 27 from logic controller 28 switches the transmitter between line 29 from the registers carrying pedestrian, vehicle, and intersection status data from local controller A, to line 26 which carries the same sort of data from another local controller. Thus, transmitter 24 transmits this data from the local controllers during the same intervals that the master controller transmits data signal trains.

The pedestrian, vehicle, and intersection status data from a given local controller can be transmitted during any interval, even the same interval that a data signal train is transmitted to that same local controller. All data flowing into a controller whether addressed to the controller or not, and all data generated at the controller goes through the same shift register. The data is shifted into the register during one interval and them shifted out during the following interval while newly arrived data is shifted in. The pedestrian, vehicle, and intersection status data from a given controller is conveniently transmitted from the controller during the interval following receipt by the controller of data from the master which is addressed to that controller. In that case, the status data need not contain the controller address.

A backup system 30 in each local controller is energized by lines from cable 11 from the backup transmitter 10 at the master controller. All lines in the cable 11 run to all backup systems in all local controllers and so all signals in these lines are simultaneously fed to all the backup systems in all the local controllers. However, each backup system in each local controller, as already mentioned, contains a program selection matrix which is a preprogrammed diode matrix. The signals in the cable 11 select the preprograms in the backup systems. The backup systems in the local controllers run continuously even while normal operation is without error or fault. When an error or fault occurs in a local controller, the backup system in that controller takes over as dictated by logic control 28 and the backup system feeds through line 31 parallel sets of signals for controlling the lamps at the intersections. These are fed through the registers 22 to the lamp drive circuits 23 using the same circuits which feed signals during normal operations controlling the lamps.

The rate of transmission of the data signal trains from the master controller to the local controllers is about twice per second. The format of data signal trains transmitted is shown by the waveform type diagrams in FIG. 3. A complete cycle of transmission includes the sequential transmission of data signal trains to all of the local controllers which are designated A, B, C---N. The data signal trains are conveniently transmitted in the sequence A, B, C---N, the complete set of trains being transmitted in 0.55 seconds. The intervals between signal trains are denoted p. The format denoted Master Transmits initiates all transmission and reception between local controllers and this includes the transmission from the local controllers back to the master controller of the pedestrian, vehicle, and status data. The waveform denoted Master Receive indicates which intersection pedestrian and vehicle data is received at the master controller during the transmission intervals. Clearly, in the interval following transmission of a data signal train to controller A, the pedestrian and vehicle data from controller A is received by the master controller and so forth. The waveforms denoted A Receives and A Repeats are the same for all local controllers and are the same format as the transmissions from the master controller. The next waveform denoted A Accepts Data represents the brief interval that pedestrian, vehicle, and status data generated at intersection A is inserted into the buffer in registers 22 at controller A. The waveform denoted A Transmits Data shows the immediately following interval during which the data from controller A is transmitted to the master. Similarly, the waveform denoted B Accepts Data represents the brief interval that pedestrian, vehicle, and status data at intersection B is inserted into the buffer register of controller B and the waveform denoted B Transmits Data immediately following this insertion represents the interval that pedestrian, vehicle, and status data from intersection B is received at the master. Clearly, pedestrian, vehicle, and status data at each intersection is transmitted to the master immediately following receipt at that intersection of a signal data train addressed to the intersection. Thus, the pedestrian, vehicle, and status data received at the master is identified as to its source without necessitating the accompanying address signals.

As already mentioned, control programs for all intersections are stored in the control computer 1 at the master. The program schedule is unique to each intersection nd includes the desired status of each lamp circuit during every part of every cycle. These schedules are retreived from the control computer 1 via the transmit buffer register 7 and transmitted as the data signal trains for relay from controller to controller. The programs are easily changed using available conversational software packages controlled by the traffic engineer. During semi-actuated or full actuated operation, the status of each lamp circuit is determined by the pedestrian and vehicle data from the same intersection.

Figure 4:
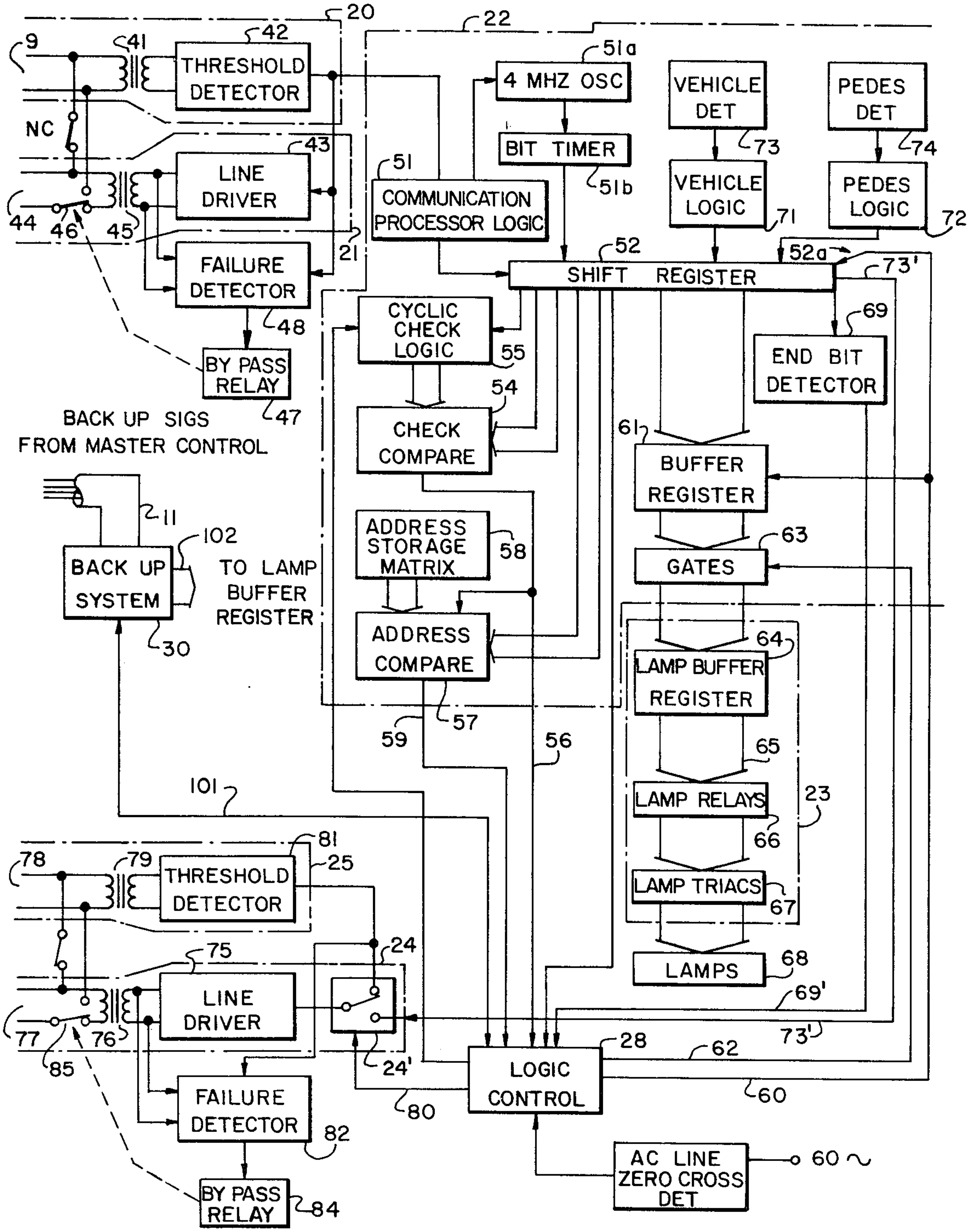
FIG. 4 is a block diagram and partial schematic showing the circuits and indicating the interconnections between circuits at a local controller.

The detail organization of a local controller illustrating more fully the functions described with respect to FIG. 2, is shown in FIG. 4. This is a block diagram and partial schematic showing in more detail the individual circuits and circuit functions at the local controller.

In FIG. 4, the two conductor transmissions line 9 from the master controller is coupled by transformer 41 to threshold detector 42 in the receiver 20. The detector data signal train, represented by waveforms A in FIGS. 8a and 8b is fed directly from the threshold detector to line driver 43 in the transmitter 21. The line driver feeds the signal to transmission line 44 via transformer 45. Line 44 which is a two conductor line carries a signal to a similar receiver in the next local controller. A switch 46 in line 44 under control of bypass relay 47 connects transmission line 9 directly to transmission line 44 in the event a failure is detected in the output of threshold detector 42 or line driver 43. Normally, when no such failure is detected, switch 46 is in the position shown and the detector 42 and line driver 43 are effective to reshape and amplify the received data signal trains from the master and transmit them on to the next controller.

The output of the receiver 20 is fed to shift register and buffer circuits 22. These circuits include the communication processor logic circuit 51 which operates on the received data signal train to produce a binary pulse train representing the received information and clock pulses. Details of the structure and operation of the communication of the processor logic circuit 51 are described herein more fully with respect to FIGS. 7, 8*a*, and 8*b*. The pulse train from circuit 51 is fed directly into shift register 52, pulse after pulse filling up the register and timed by clock pulses derived from circuit 51. Timing pulses synchronized with the clock pulses are produced by the 4 $MH_z$ oscillator 51*a* and bit timer circuit 51*b*.

When the first bit in the train arrives at the end 52*a* of the shift register 52, the arrival is detected by bit detector 53 which feeds a signal to logic controller 28. Logic controller 28 responds by generating signals that initiate a cyclic check of the received pulses to ascertain that there is no error and the received signal is complete. Following this or simultaneously with this check, the address of the received signal train is checked against the stored address of the local controller. The cyclic error check is performed by check compare circuit 54 which compares signals produced by cyclic check logic circuits 55 with check bits in the shift register. Circuit 54 produces an output signal in line 56 which indicates that the error check is complete and there is no error in the received data. The signal in line 56 initiates the address check by circuit 57 which compares the address of the received data pulses with the stored address of the controller in matrix 58 and produces a signal in line 59 when the addresses are the same. This signal is fed to control logic circuit 28.

Immediately following this, the logic control circuits 28 produce an initiating signal in line 60 which controls gates in the shift register 52 that feed the lamp data stored in the shift register to buffer register 61. Suitable delays are included to insure that the buffer register is cleared before the data from shift register 52 is inserted into it. At the next zero crossing of the 60 cycle line voltage, a signal in line 62 feeds the contents of register 61 via gates 63 to the lamp buffer register 64 which is located in the lamp drive system 23. At this point, the lamps at the intersections are all energized as dictated by the data stored in the lamp buffer register 64.

The lamps are energized by the output of the buffer register 64 which feeds by parallel lines 65 to lamp relays 66 which in turn each control lamp triacs 67 that power the individual lamps 68. Thus, the lamps switch on or off at a zero crossing of the 60 cycle line voltage. Switching at this point avoids power line current surges which would occur at switching at high excursion points of the line voltage. Power line current surges can produce faults in the system.

Figures 3, 5, 6:
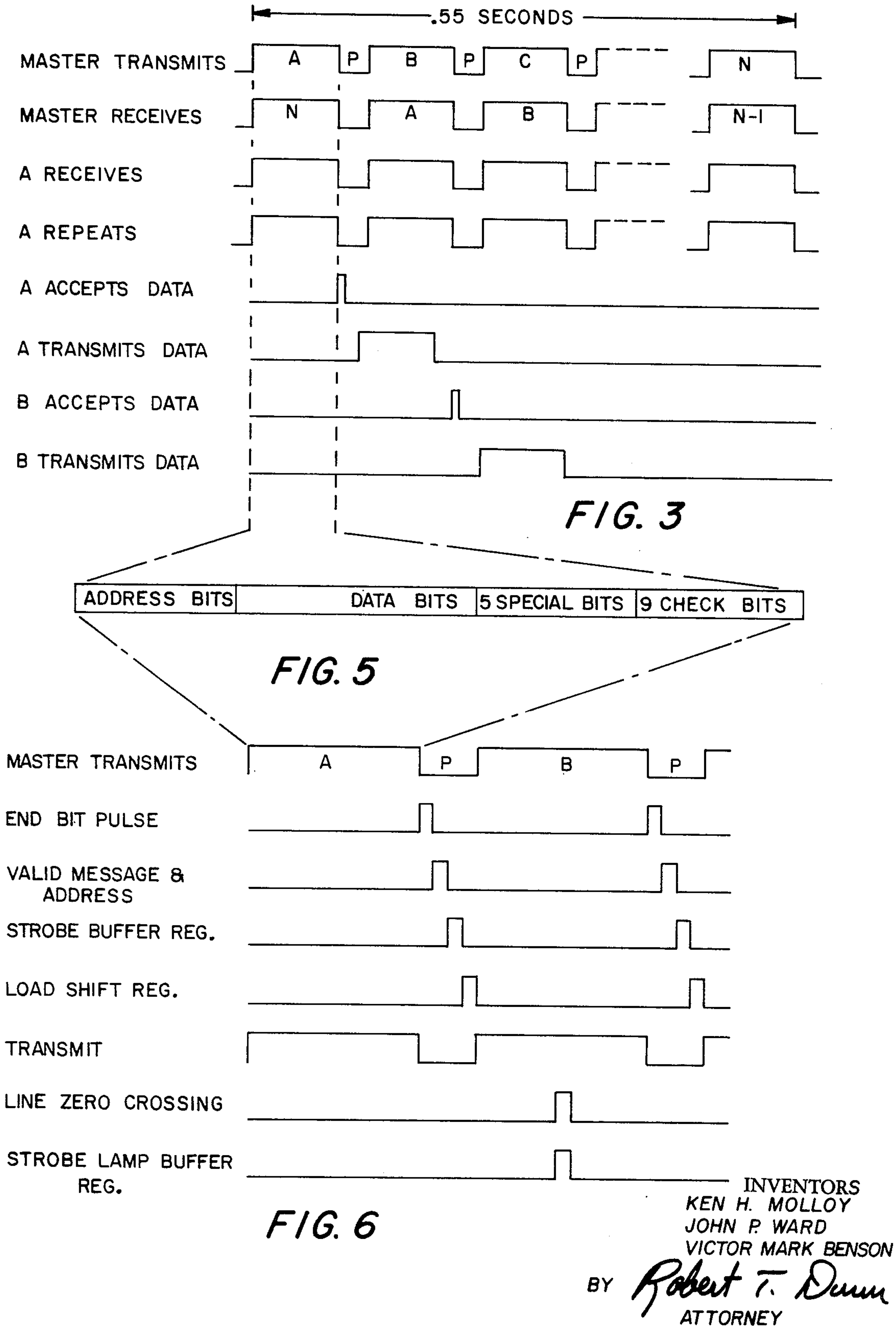

The format of a data signal train is illustrated in FIG. 5 and may consist of for example seven address bits, a multitude of data bits (which control specific lamps at the intersection) five special bits, and nine check bits. The address bits are at the end of the train. The end bit detector 69 detects the first bit in the train when it reaches the end 52*a* of the shift register. When this bit reaches the end of the shift register, it triggers the end bit pulse shown by the waveforms in FIGS. 6 and produced by the end bit detector 69. The end bit pulse occurs during the pause interval denoted P between the trains. The end bit pulse from detector 69 is applied via line 69' to the logic controller 28 which in turn initiates the cyclic check logic performed by circuit 54. And so the sequence of events described above for checking the cyclic logic of the check bits in the shift register with circuits 55 and 54 and for comparing the stored address of the data set in the shift register with circuits 58 and 57 is initiated. Thus, immediately following the end bit pulse, the cyclic check compare circuit 54 and address compare circuit 57 function to produce pulses in lines 56 and 59 denoted the valid message and address pulses which indicates that a full and complete message without error has been received in the shift register and it is addressed to the local controller. The control logic circuit 28 responds to these pulses pulsing line 60 to in effect strobe the buffer register. In other words, the set of data bits in the shift register 52 is gated into the buffer register 61. Immediately after this, vehicle and pedestrian data from logic circuits 71 and 72 triggered by detectors 73 and 74, respectively, is gated into the data stage of the shift register in parallel fashion. This occurs during the interval denoted load shift register in FIG. 6. It will be noted that all the action from the detection of the end bit in the shift register 52 to the point where the shift register is loaded with vehicle and pedestrian data, occurs during the pause interval denoted P between the data signal trains. At the end of this pause interval, the register is ready to shift out the vehicle and pedestrian data in serial fashion feeding it to the transmitter 24. For this purpose, line 73' feeds the vehicle and pedestrian data to transmitter 24 for transmission to the master controller receiver.

In transmitter 24, vehicle and pedestrian data in serial form is fed via electronic switch 24' to line driver 75. The output of line driver 75 is coupled via transformer 76 to the two conductor transmission lines 77. If the controller is local controller A, then transmission line 77 is the same as line 4 shown in FIGS. 1 and 2. If the controller is controller B, then the transmission line 77 connects the equivalent of transmitter 24 in controller B to receiver 25 in controller A. The receiver 25 in controller A receives signals from the equivalent of transmitter 24 in controller B via transmission line 78. These signals are coupled by transformer 79 to threshold detector 81 and fed from the detector via electronic switch 74 to line driver 75 for transmission to the master controller. This is the case when the switch 74 is conditioned as illustrated in FIG. 4 as dictated by the output in line 80 from control logic circuits 28. Failure detector circuit 82 detects failures in the output of threshold detector 81 and line driver 75 and deenergizes bypass relay 84 when a failure occurs. Relay 84 operates switch 85 in line 77 which shortcircuits signals directly from transmission line 78 to transmission line 77 bypassing the detector and line driver. This shortcircuit system is substantially the same as the one described above with reference to receiver 20 and transmitter 21.

The data signal train as already mentioned is a bipolar waveform which carries both data as binary information and synchronous timing. This waveform illustrated typically by the waveforms A in FIGS. 8*a* and 8*b* into all the local controllers substantially simultaneously in series where it is amplified, reshaped, and transmitted by the transmitters and receivers such as 21 and 20 that have been described. Clearly, the message train format is binary digital. The binary information is carried in the transitions of the waveform from plus to minus. These are the bipolar transitions. The waveform always makes a transition at clock time and these transitions generate a delayed window which brackets the expected time for the clock transition. A binary 1 is transmitted if the waveform transition during the window goes in the same direction as the previous transition at the previous clock transition. A binary 0 is transmitted if the waveform transition goes opposite to the previous clock transition. This technique using a window provides an improvement in signal to noise ratio by restricting the time that receiving circuits are allowed to be sensitive to line noise. Also, the waveform must exceed a positive or negative threshold before any transitions are allowed and so a further signal to noise ratio improvement is effected. These thresholds can be set to further noise rejection as desired.

Figure 7:
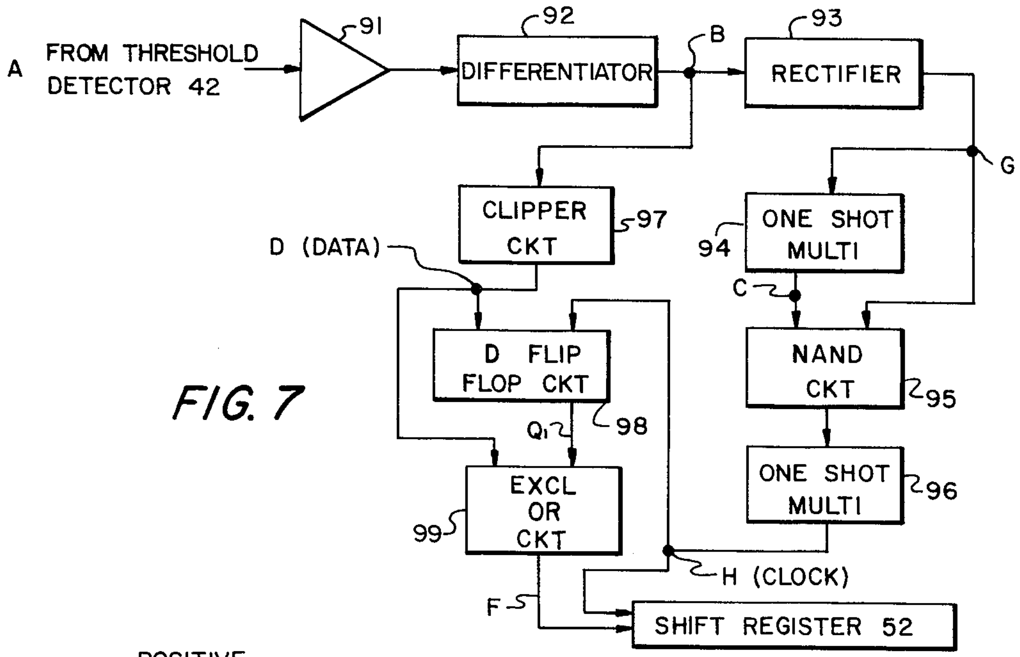
FIG. 7 is a block diagram illustrating the communication process logic circuits at each local controller for extracting data pulses and clock pulses from the received data signal train.

The composition of the data signal train from the master starts with a line pause in the two conductor transmission line 9. This is followed by a negative line transition in the waveform called the start pulse as shown in the waveforms A of FIGS. 8*a* and 8*b*. The waveforms in FIGS. 8*a* show transmission of all binary zeros or 0000 along with clock pulses. The waveforms in FIG. 8*b* show transmission of 0010 along with clock pulses. The other waveforms in these figures illustrate the signals at various points in the communication process logic circuit shown in FIG. 7 and denoted 51 in FIG. 4. The waveforms in the figures are lettered as are the points in the decoder logic circuit identifying where the waveforms occur. As shown in FIG. 7, the waveform A is amplified by amplifier 91 and differentiated by differentiator circuit 92 producing the waveform B. This is rectified by rectifier 93 producing waveform G which triggers one shot delay circuit 94 producing waveform C. These are gated by NAND gate 95 which triggers one shot multi-vibrator 96 producing the waveform H which is the clock pulses. The output of differentiator 92 which is waveform B is clipped by clipper circuit 97 producing waveform D that is fed along with waveform H to a "D" flip-flop circuit 98. One stage output denoted Q1 of flip flop 98 is gated with waveform D by Exclusive OR gate 99 producing a pulse train F. The clock pulses H strobe this pulse train into the shift register 52. This pulse train is the message of the format shown in FIG. 5.

The length of the data signal train transmitted by the master controller and therefore the length of the message, can be arbitrarily long and is only limited by the size of the shift register and buffer registers at the local controller. The message includes data for controlling the lamps, address data, and error checking data. This data transmission scheme with the data and clock carried by the bipolar waveform shown in FIGS. 8*a* and 8*b* has a high degree of noise rejection, because of thresholding and gating. In addition, only a single pair of lines (the two conductor transmission lines) are needed to service a multitude of local intersections.

Figure 9:
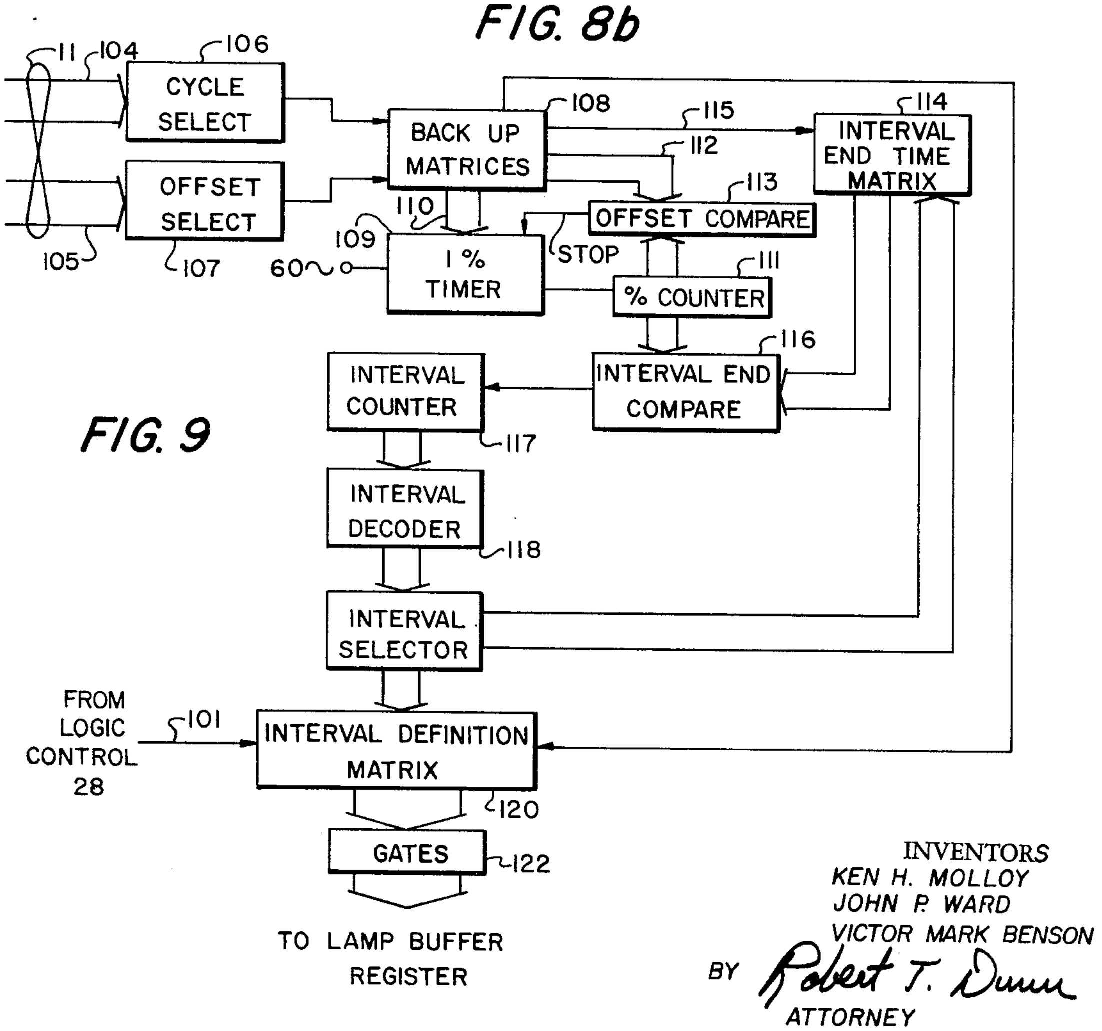
FIG. 9 is a block diagram showing the backup controller at each local controller which inserts signals into the buffer register that controls the lights when certain failures occur in normal operation.

A detailed block diagram of the backup system in each local controller is illustrated in FIG. 9. The backup system is controlled by a multitude of lines in a cable 11 from the master controller. The lines on the cable are energized by the backup transmitter 10 at the master controller. Signals are transmitted over these lines continually even while normal operation is proceeding and so at each local controller, the backup system is ever ready to take over and control the lamps at the intersection should the normal system fail. Also a signal from the master controller represented by a bit in register 52 can initiate the backup system by producing a signal in line 101 to logic circuits 28.

A signal from control logic system 28 in line 101 to the backup system initiates insertion of the backup system commands over lines 102 into the lamp buffer register 63. This is shown in FIG. 4. Within the backup system 30, as illustrated in FIG. 9, the cable 11 from the master controller includes three cycle select lines 104 and three offset select lines 105. The cycle select lines 104 are fed to cycle select circuit 106 and the offset lines are fed to offset select circuit 107. The outputs of these selectors are fed to the backup system matrices circuits 108 which are preprogrammed for the particular intersection. The lines in cable 11 are all energized with 110 volt ac which is either on or off and so the signalling over these lines is binary. Depending upon the signal combinations in these lines, a particular cycle length, cycle intervals, interval end times, and cycle offset are selected from the matrices. These are selected as binary numbers which are inserted from the matrices into other circuits as described below.

The binary number representing cycle length is inserted from the matrices into the 1 percent timer circuit 109 via lines 110. The 1 percent timer 109 responds to pulses from the local ac line and triggers 0/0 counter 111 which counts to 100 for each cycle length. For example, in timer 109, the number from the matrices 108 is inserted into a counter which is triggered every 10th excursion of the 60 cycle reference and each time this counter overflows, a pulse is produced which triggers 0/0 counter 110. The interval between these overflow pulses is related to the cycle length number inserted from the matrices. It is convenient if 100 such overflow pulses occur during the interval of the commanded cycle. Then, each overflow pulse represents a one percent interval of the commanded cycle. The overflow pulses, denoted one percent timer pulses, are fed to the percent counter 111 which continues to count until the output compares with the offset command output from the matrices. The offset command output is inserted from the matrices via lines 112 into offset compare circuit 113. When the offset command number in comparator 113 is the same as the count number in counter 111, a stop pulse is produced and fed to the one percent timer 109 which stops timing and so the pulse flow from timer 109 to counter 111 stops.

If the local intersection is at the proper offset, then at the time of the stop pulse from the compare circuit 113, the appropriate offset select line in cable 105 from the master controller will open briefly causing the offset matrices in 108 to output a signal in lines 112 which causes the stop signal output from comparator 113 to be removed and the 1 percent timer will continue pulsing the counter 111 which will continue to count in 1 percent increments of the cycle. Thus, the counter 111 counts to 100 during the interval of each cycle length called for by the master controller. This count is offset in time as dictated by the offset signal from the master controller. The functioning of the circuit is as follows: if for example, the offset is 20 percent, then the number from the matrices 108 inserted into offset comparator 113 will be 20 percent and if the counter 111 reaches the count of 20 when the offset select line from the master opens then the counting continues, because the counter 111 will be at the correct offset commanded by the master controller. On the other hand, if the counter is not at the right number when the offset select line opens, counter 111 will keep on counting, but will stop as soon as it reaches 20 and then wait for the next timing signal from the master controller.

The count numbers from the counter 111 are compared with the interval end time numbers triggered by the matrices 108 via line 115 from interval end time matrix 114. The interval end time matrix 114 produces a set of interval numbers which are each associated with a portion of the cycle. Each time one of these interval numbers from matrix 114 compares with the count number from counter 111, comparator 116 triggers the interval counter 117 which in effect counts the number of intervals in sequence during a cycle. These count numbers from counter 117 are decoded by interval decoder 118 which selects the set of lamps at the intersection which are to be energized during the inverval from interval selector 119. This energizes the interval definition matrix 120 which feeds a parallel set of signals to the lamp buffer register 63 via gates 122 as shown in FIG. 4. In this manner, the backup system takes over when signalled over line 101 by logic controller 28 to gates 122 and controls the lamps at the intersection when a failure occurs in the normal operating system or when selected by the master controller as dictated by the control logic circuit 28.

The traffic control system described herein in the embodiment of the present invention is an example of the best known use and application of the various features of the invention. These are embodied in the computerized traffic control system described. More particularly, these features relate to the operation and functioning of the traffic local controllers and the transmission lines and transmission systems between the local controllers and the master controller. These in conjunction with the format of signals that are transmitted between local controllers and the master controller embody the significant improvements of the present invention. The specific details of the master controller are not described herein except as to general functions.

It is deemed that one ordinarly skilled in the art with knowledge of the functioning and programming techniques for modern general purpose digital computers could provide the master controller operating as described herein without further invention.

The various details described herein relating to the local controller and transmission lines systems between the local controllers and the master controller and the format of signals transmitted and used illustrate but one particular useful application of the invention. It will be understood by those skilled in the art that various changes in form and details may be made therein without departing from the spirit and scope of the invention.

What is claimed is:

1. In a traffic signal control system for controlling traffic signal lights at a plurality of intersections from a master controller, a communication and control system comprising,
means at the master controller for generating and transmitting sets of data bits,
local controller means at each of N intersections for receiving and storing said sets of data bits,
signal transmission means between said transmitter and said receiver means, and
means at each intersection local controller responsive to said sets of data bits for energizing said intersection lights,
each data bit being independently effective to control a specific light at a specific intersection.

2. A traffic control system as in claim 1 where,
data bit transmitter means are included at each of said intersection local controllers,
whereby each set of data bits is transmitted from the master controller to a first of said local controllers and from said first local controller to a second of said local controllers and so forth to all of said intersection local controllers one after another in sequence from one to N.

3. A traffic signal control system as in claim 1 wherein,
included with each set of bits is an intersection address set of bits, each local controller includes means for detecting said address set of bits, and
means responsive thereto for applying each received data bit to control at least one light at the intersection when the address set of bits for said local controller is detected.

4. A traffic signal control system as in claim 1 wherein,
the master controller includes a receiver,
at least some intersections include vehicle detectors and pedestrian actuators which produce vehicle and pedestrian data return signals,
each intersection local controller includes a return signal transmitter and a return signal receiver feeding said return signal transmitter,
such that the *n*th local controller receives return signals from the *n* plus 1 and transmits them to the *n* minus 1 controller and also transmits the local *n*th intersection vehicle and pedestrian data return signals to the *n* minus 1 controller and so forth from local controllers N to one,
whereby the return signals from all local controllers are transmitted in relay fashion to a master controller receiver.

5. A traffic signal control system as in claim 1 wherein,
the sets of data bits are each in a train of pulses,
each intersection local controller includes a shift register for storing data bits of the received data set, each bit of a set being stored therein at a stage of said shift register representative of a given intersection light,
means responsive to the last stage of said register for applying the output of said register to said means for energizing said intersection lights.

6. A traffic signal control system as in claim 1 wherein,
the sets of data bits are each in a train of pulses,
each train includes an intersection address set of bits,
each local controller includes means for detecting said address set, and
means responsive thereto for applying each received data bit to control at least one light at the intersection when the address set for said local controller is detected,
each intersection local controller includes a shift register for storing the data bits of the received set, each bit of a set being stored therein at a stage of said shift register representative of a given intersection light,
means responsive to the last stage of said register for applying the output of said register to said means for energizing said intersection lights.

7. A traffic signal control system as in claim 3 wherein,
the sets of data bits are each in a train of pulses,
said pulse trains are transmitted during transmit intervals which are spaced by local controller logic intervals, and
during said local controller logic intervals, one of said local controllers detects said address set and in response thereto, applies each received data bit,
whereby the stored data bits initiate control of the lights at said one local controller intersection.

8. A traffic signal control system as in claim 7 wherein,
the master controller includes a receiver,
at least some intersections include vehicle detectors and pedestrian actuators which produce vehicle and pedestrian data return signals,
each intersection local controller includes a return signal transmitter and a return signal receiver feeding said return signal transmitter,
such that the *n*th local controller receives return signals from the *n* plus 1 and transmits them to the *n* minus 1 controller and also transmits the local *n*th intersection vehicle and pedestrian data return signals to the $n$ minus 1 controller and so forth from local controllers N to one, whereby the return signals from all local controllers are transmitted in relay fashion to a master controller receiver, and during the local controller logic interval that said $n$th local controller responds to the received data signal train by energizing the intersection lights, said return transmitter at said local controller transmits to the return signal receiver of the $n+1$th local controller.

9. A traffic signal control system as in claim 8 wherein, each intersection local controller includes a shift register for storing the data bits of the received data set, each bit of a set being stored therein at a stage of said shift register representative of a given intersection light, means responsive to the last stage of said register for applying the output of said register to said means for energizing said intersection lights, said vehicle and pedestrian data signals at a given intersection are stored in the shift register of the local controller for that intersection during said local controller logic intervals and are fed therefrom to the return signal transmitter during said same interval.

10. A traffic signal control system as in claim 9 wherein, said sets of data bits are addressed in sequence to the local controllers in the order 1 to N.

11. A traffic signal control system as in claim 9 wherein, said sets of data bits are addressed in sequence to the local controllers in an order other than 1 to $N$.

* * * * *